United States Patent [19]

Hepler

[11] Patent Number: 5,551,863
[45] Date of Patent: * Sep. 3, 1996

[54] SELF-CONTAINED RUNNERLESS MOLDING SYSTEM

[75] Inventor: Douglas C. Hepler, Rochester, N.Y.

[73] Assignee: Polyshot Corporation, Henrietta, N.Y.

[*] Notice: The term of this patent shall not extend beyond the expiration date of Pat. No. 5,464,343.

[21] Appl. No.: 309,579

[22] Filed: Sep. 21, 1994

Related U.S. Application Data

[63] Continuation-in-part of Ser. No. 249,089, May 25, 1994, Pat. No. 5,464,343, which is a continuation of Ser. No. 982,473, Nov. 27, 1992, abandoned.

[51] Int. Cl.$^6$ ................................... B29C 45/22
[52] U.S. Cl. ............... 425/549; 264/328.15; 425/570; 425/572
[58] Field of Search .................... 425/570, 572, 425/549; 264/328.15

[56] References Cited

U.S. PATENT DOCUMENTS

| | | | |
|---|---|---|---|
| 3,568,256 | 3/1971 | Johnson, Jr. | 425/570 |
| 3,758,252 | 9/1973 | Kohler | 425/570 |
| 4,034,952 | 7/1977 | Stewart | 425/572 |
| 4,921,708 | 5/1990 | Gellert | 425/568 |
| 5,217,730 | 6/1993 | Teng | 425/572 |

OTHER PUBLICATIONS

Excerpts from advertising materials of Mold Masters limited believed to have been published in 1989.
Excerpts from advertising materials of enrietti SYSTEM believed to have been published prior to the filing date of this application.
Excerpts from advertising materials of Spear System, Inc. believed to have been published prior to the filing date of this application.
Excerpts from advertising material of DME believed to have been published prior to the filing date of this application.

*Primary Examiner*—Tim Heitbrink
*Attorney, Agent, or Firm*—Francis J. Caufield

[57] ABSTRACT

A high precision, self-contained runnerless molding system for use particularly in bench top molding machines. The system comprises two mold halves, one affixed to the fixed platen of the machine and the other moveable with the moveable platen of the machine. The fixed halve is integrated with heated sprues and interchangeable tips. One zone of temperature control suffices for regulating plastic temperature in the delivery system. The other half carries the "B"-plates and cooling system. Multiple drops are possible even with only one thermal control zone.

10 Claims, 6 Drawing Sheets

SELF-CONTAINED RUNNERLESS MOLDING SYSTEM

CROSS-REFERENCE TO RELATED APPLICATION

This application is a continuation-in-part of U.S. patent application Ser. No. 08/249,089 filed on May 25, 1994, now U.S. Pat. No. 5,464,343 issued on Nov. 7, 1995, which in turn is a continuation of U.S. patent application Ser. No. 07/982,473 filed on Nov. 27, 1992 and now abandoned.

BACKGROUND OF THE INVENTION

1. Field of the Invention

This invention in general relates to the field of injection molding and in particular to high-precision, self-contained hot runner systems that are particularly suitable for use in bench-top type molding machines or other molding environments where space is at a premium.

2. Description of the Prior Art

In plastic injection molding processes, a thermoplastic or thermoset molding compound is first heated to plasticity in an injection cylinder at controlled temperature. Afterwards, the plasticized compound is forced from the cylinder through a nozzle by means of pressure generated within the cylinder. After emerging from the nozzle, the plasticized compound passes through a hole in a mold plate, usually stationary, and is then conveyed along a flow channel(s) to the mold cavity. The flow channel, depending on mold architecture, may comprise one or more sprue bushings and/or runner systems, which may or may not be heated for temperature control. Once in the cavity, the molten resin assumes the shape of the cavity and then is cooled to the point where it solidifies in the external shape of the cavity. The mold is then opened, and the part is ejected or otherwise removed. The entire process is usually automated with clamping and unclamping of mold parts during and after injection, and their removal after cooling, taking place under the control of a microprocessor or other form of automated controller.

For best process performance, regardless of part size, it is known to be beneficial to control the temperature of the plasticized compound more or less constant throughout its travel to the cavity. This reduces process problems associated with material degradation due to thermal variability, improves yield by decreasing scrap losses, and increases machine production time by reducing down time due to freeze offs.

However, while standardized in many respects, particularly with respect to mold base or plate thicknesses, present molding machinery does not always provide for precise temperature control to take advantage of its beneficial effects. Indeed, much of the available machinery is still run employing poor control techniques allowing the temperature of the resin to vary from the time it leaves the nozzle until it reaches a zone in the mold where temperature control is reacquired with internal heating channels in the mold, for example.

In early mold practice, the most commonly used injection mold was one with a conventional runner system fed by a sprue. Such designs incorporated traditional unheated or cold sprue bushings to accept the melt delivered from the molding machine nozzle. Standard sprue bushings employed were available in a variety of styles and lengths to meet many anticipated molding applications. Such bushings, especially those of more recent design, while unheated, were provided with standard spherical radii and orifice sizes to be compatible with available nozzle configurations.

Here, the runner system was cut at the parting line to route plastic to the cavities. Full round runners were, and perhaps still are, the most efficient and popular because they afforded the least heat loss per unit volume of material flow. While offering an economical approach to mold construction, the conventional runner system was most frequently employed for short-run applications. Its major disadvantage is the requirement for degating parts and the need for regrinding of the runners and sprue, both labor intensive operations which do not readily lend themselves to automation nor substantial economic benefit.

Three plate molds were an improvement over the conventional mold approach in that they can automatically degate parts in the molding cycle and also allow the part to be gated on the top, usually a more desirable position for some part shapes such as round ones. Because of the three plate scheme, two additional parting lines are available to allow automatic separation of the runner from the part. However, the three plate approach by itself afforded no additional advantage in terms of thermal control.

Consequently, no matter what type of molding strategy is employed, the runner and or runner and sprue system must still function to get the material to the cavity with a minimum of loss of temperature and pressure and to provide for subsequent part cooling. To achieve this purpose, those in molding arts have employed a number of approaches.

One is the insulated runner mold. Very few of these are built today because other runnerless molding technologies perform much better than this type. For historical reasons, however, they are interesting for the strategy they employed. This mold design relied on a very thick runner system whose outside regions would solidify with heat loss to form an insulation layer at the outside of the runner. Closer to the center, higher temperature was maintained because of lower heat loss due to the outside insulating properties, thus allowing the new melt to flow through the center in an open flow path. While easy to build, this style of mold was extremely difficult to run, particularly when cycle interruptions occurred. If new material was not frequently introduced into the system, the insulated runner would freeze, and the cull would have to be physically removed from the mold. As this was a frequent occurrence, the runner plates were latched together, and the machine clamping pressure was relied on to keep the plates from separating under injection pressure. While successful under some circumstances, like fast cycles and large shots with particular plastics, this type of mold largely is a thing of the past.

Next, in terms of least expense for initial cost and continued maintenance, is the internally heated runnerless molding system. In this system, material from the machine nozzle enters through a heated nozzle located in the flow channel where heat is supplied to the plastic by a thermocouple cartridge heater located inside a distributor tube held in position by end caps. Melt is distributed to probes, or to secondary distributor channels, through either round bores in solid plates or trapezoidal channels in split-plate designs. The molten plastic flows along the gate probe to the gate and into the cavity.

These type of systems are relatively insusceptible to material leakage. They are constructed of solid blocks with gun-drilled distributor channels. The distributor plates are retained with Allen head cap screws of sufficient strength to withstand the molding injection pressures. Such systems usually comprise pre-engineered components with application information being supplied on varied miniprints for the mold maker to design and build a mold compatible with available styles. As plastic is heated from the inside out, less power is required than with externally heated systems. Probes, located near the gate, provide heat for thermal control at the gate, allowing drool-free molding without gate freeze-up. Cycle interruptions of up to five minutes are possible without freezing the gate in these type of systems.

Externally heated runnerless molding systems are also known. These are called manifolds and are heated with either round cartridges or cast-in heaters to a temperature sufficient to keep the plastic being processed in a molten condition. The machine nozzle mates to a nozzle seat in the form of a replaceable contact area. Plastic flows from the molding machine, through the nozzle seat, to a lead-in channel, and then into a primary flow channel. The primary channel delivers the plastic to bushing drops. The flow channels are bored into the manifold to form channels for plastic to flow. Additional flow channels may connect, forming secondary, or even tertiary, flow paths before ending at bushing drop locations. Specific bushing diameters and flow channel sizes are recommended based on flow volumes and material viscosity. Thermocouples are located at several locations within the manifold to monitor temperature and provide feedback information for control purposes.

More sophisticated practice, apparently not yet universally accepted, recognizes the advantages of controlling temperature by employing hot sprue bushings to convey material from the nozzle to the cavity gate often times through the fixed mold plate, sometimes referred to as the "A" plate. A variety of approaches for providing heat in these hot sprue bushings have been used. Among these are the use of resistive heating elements and heat pipes such as those described in U.S. Pat. No. 4,034,952 entitled "HOT PLASTIC INJECTION BUSHING" issued on Jul. 12, 1977. In the latter case, the heat pipes are used to transfer heat from electrically powered heater bands located at the nozzle end of the sprue bushing to regions along the bore near the tip.

In multicavity applications capable of providing more than one part per molding cycle, hot sprue bushings and internally heated molds, including those employing manifolds, generally occupy a large percentage of mold real estate per cavity.

With the advent of small molding machines, which can be used on bench tops, a need has arisen for mold architectures that are simple in form and provide thermal control with the fewest number of plates consistent with part requirements and molding conditions. Because of the smaller spaces available, the traditional use of multiple plates to provide the needed functions of proper thermal control, part shape, and cooling are not optimal because the number of plates required to provide all of these functions introduces precision and alignment challenges which are aggravated with smaller working geometry.

Consequently, it is a primary object of this invention to provide a highly reliable, precision, self-contained hot runner system for use in bench top type molding systems or other molding environments where space is limited.

It is another object of this invention to provide a self-contained hot runner system that simplifies molding architecture so that it can be used in machines having small tie bar spacing and/or open platen separation.

It is another object of this invention to provide a multitip hot runner system that may have its tips easily replaced or changed for a different style.

It is yet another object of the present invention to provide a self-contained hot runner system with only one thermocouple and yet provide balanced temperature and pressure control throughout its delivery architecture.

It is yet another object of the present invention to provide a self-contained multitip hot runner system available in a variety of configurations employing varying numbers of tips.

It is yet another object of the present invention to provide a self-contained hot runner system having an interface for use with an injection machine nozzle or a manifold.

It is yet another object of the present invention to provide a simplified molding architecture in which the need for alignment pins and/or mold bases is substantially reduced.

Other objects of the invention will, in part, be obvious and will, in part, appear hereinafter. A full understanding of the invention will best be had from reading the detailed description to follow in connection with the detailed drawings.

SUMMARY OF THE INVENTION

This invention relates generally to injection molding machinery and particularly to high precision, self-contained runnerless molding systems for use particularly in bench top molding machines. The system comprises two mold halves, one affixed to the fixed platen of the machine, and the other moveable with the moveable platen of the machine. The fixed half is of integrated form containing heated sprues and interchangeable tips. One zone of temperature control suffices for regulating plastic temperature in delivering plastic via this mold half.

The other half carries all of the plates and associated functions downstream of the parting line including cooling. Both halves are complementary configured to automatically align with a nesting action. Multiple drops are possible even with only one thermal control zone.

The self-contained half of the mold comprises a nozzle or manifold interface, externally heated flow passages, and interchangeable or replaceable tips. A fully hardened body permits a number of different multitip configurations all of which maintain uniform heating throughout the distribution architecture with the use of only a single thermocouple for temperature control. Configurations preferably are provided in 4 or 8 tip styles, although others are possible. Heating is via cartridges internal to the body with the number present depending on the tip configuration. In each case, each flow channel feeding a tip is heated on both sides to provide a delivery system that is balanced in both pressure and temperature so that part cavities are filled at the same rate and speed for part consistency and quality.

In addition, all interface surfaces in the system are preferably flush mounted through the use of lapped mating surfaces to eliminate the need for "O" rings.

The cavity carrying half of the mold system and the self-contained half are complementary configured to mate with one another along an interface to provide both axial and lateral alignment and to assure correct transfer of forces throughout the mold and prevent the system from experiencing deleterious effects due to flexing under load.

DESCRIPTION OF THE DRAWINGS

The structure and operation of the invention together with other objects and advantages thereof may best be understood by reading the derailed description to follow in which the same reference numerals have been used throughout to designate the same part and wherein.

DETAILED DESCRIPTION

Figure 1:
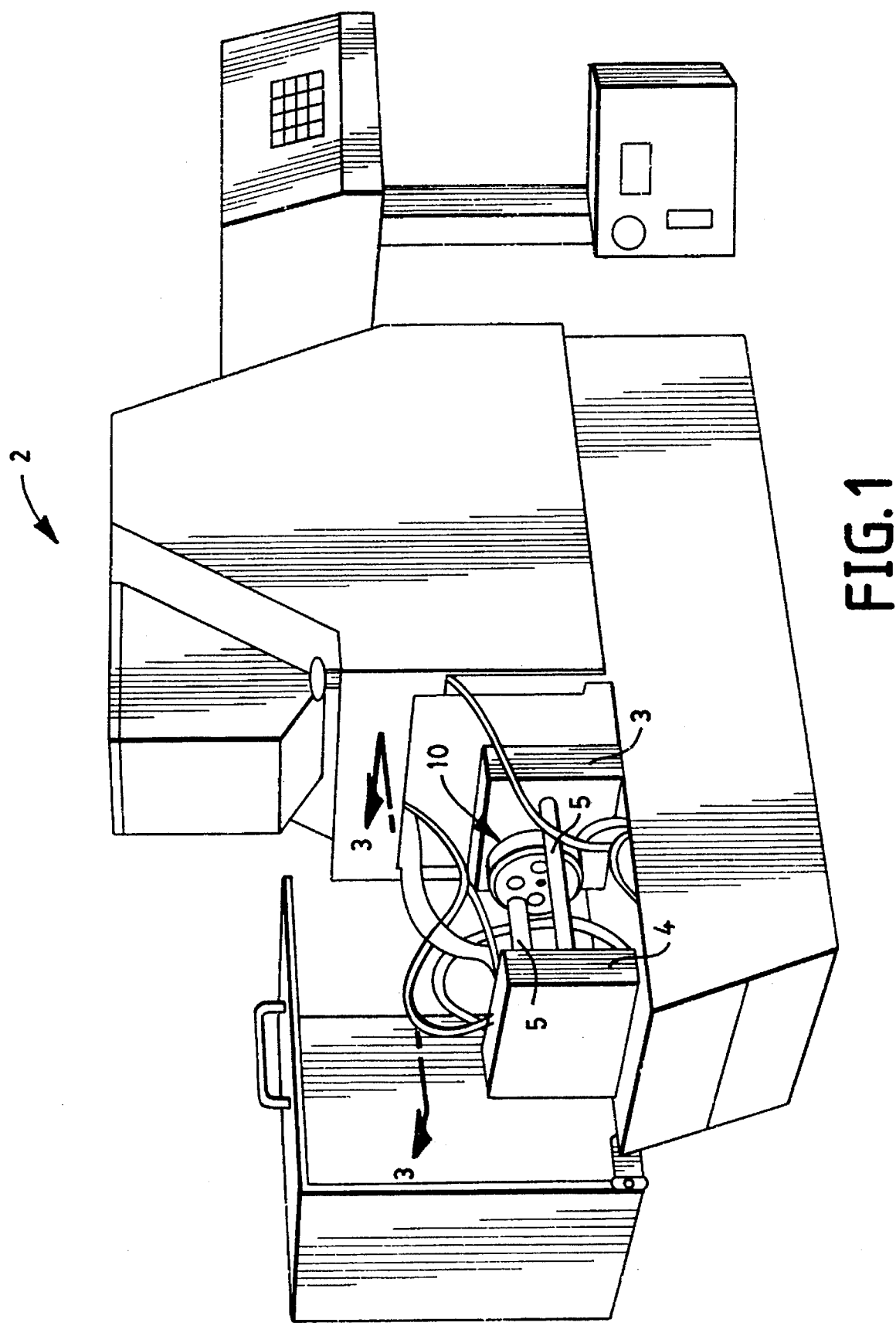
FIG. 1 is a diagrammatic perspective view of a bench top molding machine of the type with which the present invention is particularly suitable for use.

This invention comprises a high-precision, fully self-contained hot runner molding system that is particularly suitable for use in bench-top type molding machines of small size. Such a machine is illustrated in FIG. 1 where it is designated at 2. Machine 2 is typical of a bench-top type that is small in size but quite capable of performing major molding work. Clamp force is around six (6) tons, full stroke approximately 115 mm (distance between fixed platen 3 and moveable platen 4), and separation between tie bars (designated at 5) approximately 110 min. Injection pressures range between 5600 psi and 18,000 psi, or so, depending on injection unit design and capacity. Other features of such machines, such as the injection section and control system, are well-known and are not part of this invention.

Given the size and characteristics of such machines, there is little available space within which to provide all of the functions necessary to fabricate plastic parts. The present invention addresses these problems by providing a molding architecture that eliminates the need mold bases and locating pins between the base and cavity plates which otherwise be employed to provide flow control, cavity definition, and cooling.

Figure 2:
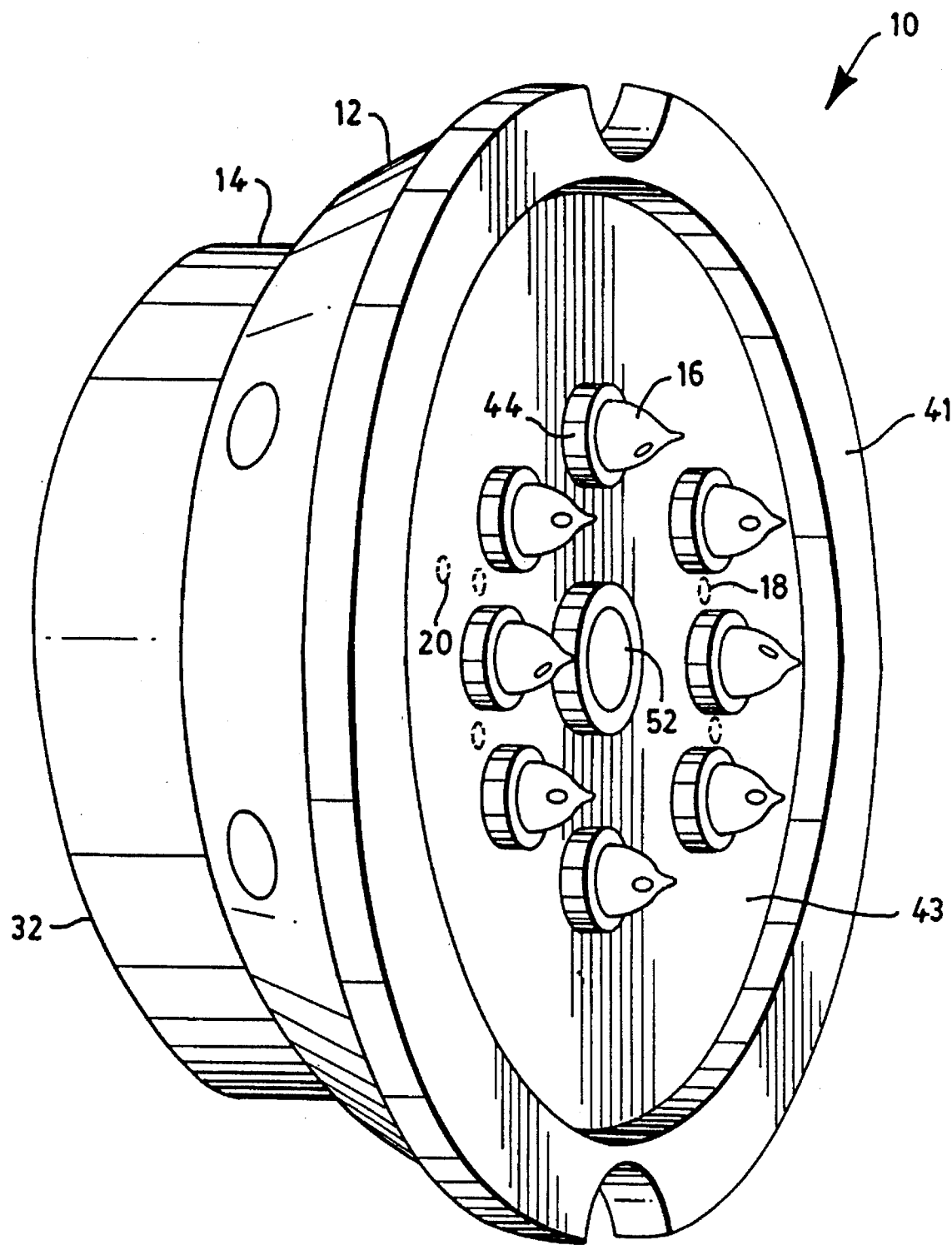
FIG. 2 is a diagrammatic perspective view of the self-contained unit of the fixed half of the mold of the invention for use in the machine of FIG. 1.

As best seen in FIGS. 1 and 2, the inventive molding architecture comprises two major mold halves. One is a fixed, self-contained half 10 that is bolted to the fixed platen 3 of machine 2. The other is a moving half 11 that is affixed to the moveable platen 4 of molding machine 2. The self-contained half 10 consists of a nozzle or manifold interface, externally heated flow passages, and field replaceable tips. Bolted to half 10 is the cavity carrying plate that is automatically aligned to it without the need for locating pins. It employs a fully hardened distribution body that can be adapted for 4 or 8 integrated tips or some other number if required to provide a corresponding number of cavity drops. Heating is by internal cartridges placed within the hardened body. One zone of control monitors temperature via an independent thermocouple which is located near a typical gate orifice and provides feedback to a well-known power controller for temperature control of all tips.

Referring now to FIG. 2, an eight tip version of mold half 10 is shown. The eight tip version is shown to illustrate the features and principles of operation common to all versions of the invention and is hereinafter referred to as "mold half 10". As can be seen, mold half 10, comprises three major parts: a generally circularly symmetrical body 12, a manifold/nozzle and platen interface 14, and a plurality of heat conducting tips 16 extending proud of the bottom of body 12 from which molten plastic is introduced to mold cavities via their gates, as will become more readily apparent.

Tips 16 are identical to one another so are to be considered typical in material composition and design in each of the embodiments of the invention. However, as will be seen later, tips 16 may each themselves be of different configuration depending on the molding tasks.

In preferred form, mold half 10 is approximately 2 inches high and has a diameter somewhat less than 5 inches. Overall the height of mold halves 10 and 11 in their closed configuration is approximately 4.3 inches.

Figure 7:
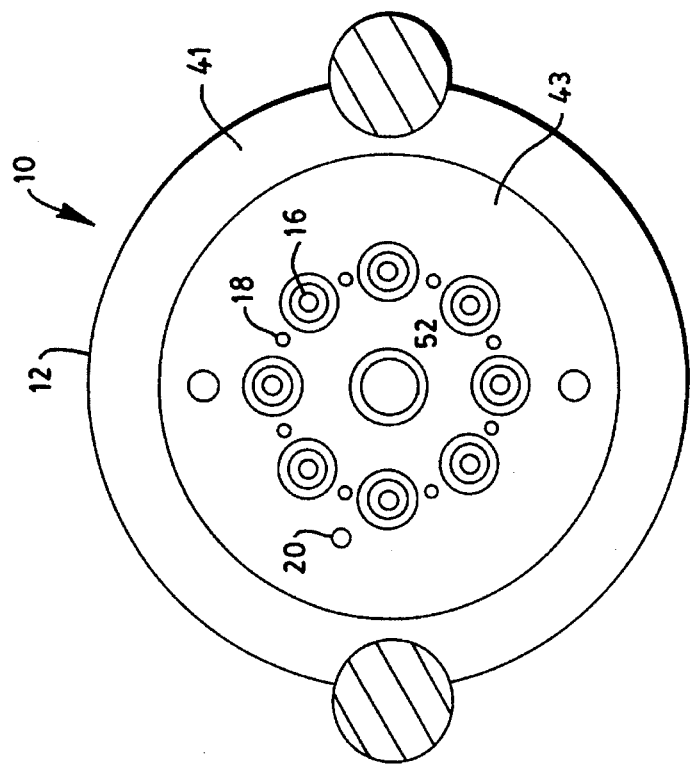
FIGS. 6 and 7 are diagrammatic plan views of alternate drop patterns that may be used in the invention.

Indicated in FIGS. 2 and 7 as equally spaced dotted circles 18 are heating cartridges, one for each tip 16. The heating cartridges, which themselves are not shown and are not part of this invention, are resistance type elements of well-known design that operate preferably at 208 to 230 volts A.C. They are readily commercially available to design specifications and can be fabricated to provide uniform or variable heating power throughout their length. Here, the heating elements preferably deliver uniform heating along their length. However, if particular circumstances dictate the need for it, variable heating is readily available.

The single dotted circle 20 represents the single thermocouple of the invention. In all versions of the invention, thermocouple 20, which is conventional and only diagrammatically shown, is placed as close to one of the tips 16 as space will allow so as to be able to closely monitor the temperature as near a tip as possible.

Figure 3:
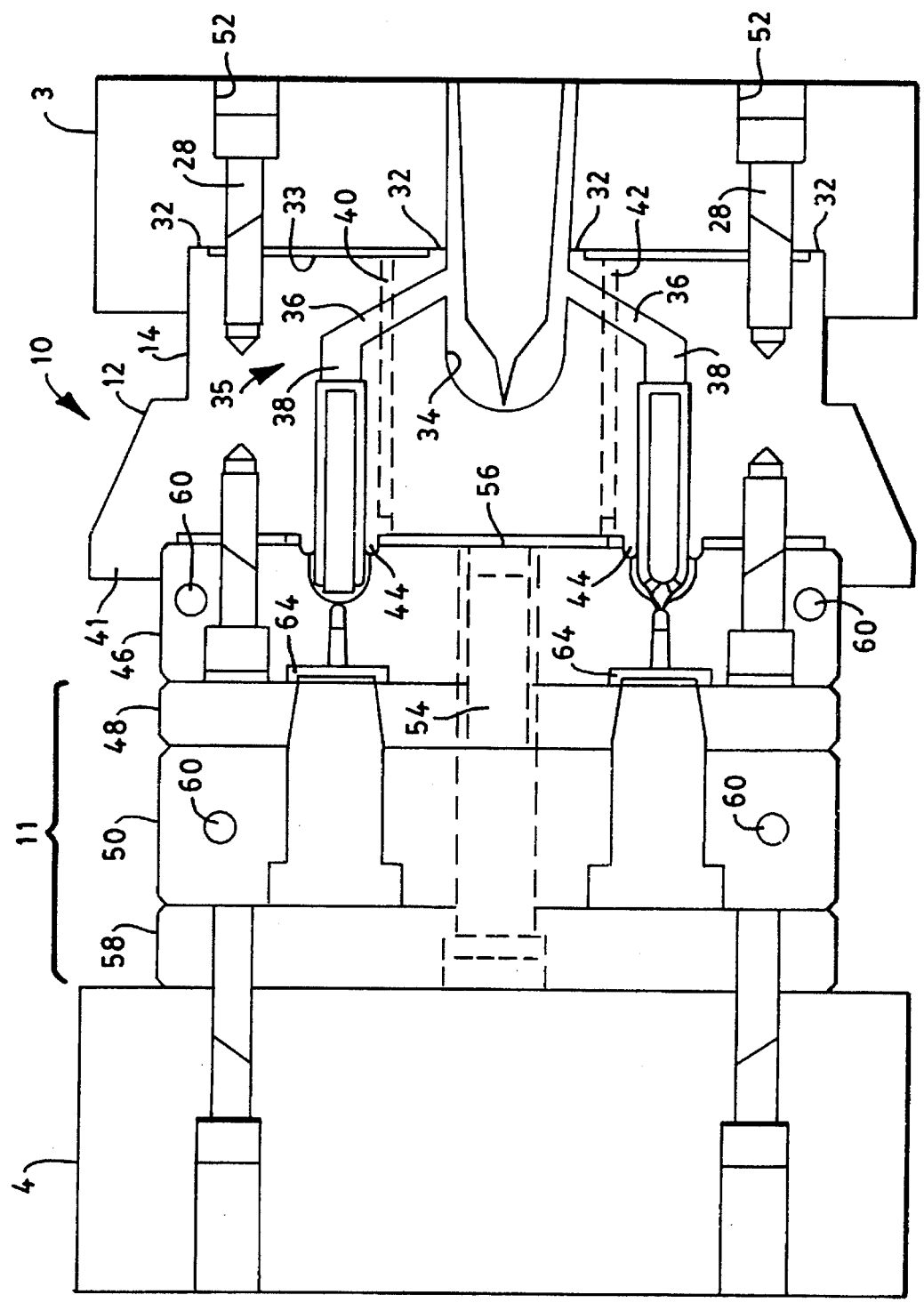
FIG. 3 is a diagrammatic cross-sectional view of the molding system of the invention taken generally along line 3—3 of FIG. 1.

Body 12 is preferably constructed of fully hardened steel for strength and ruggedness and serves as the primary means for distributing plastic from the injection nozzle (see "70" in FIG. 3) to tips 16 as well as housing heating cartridges 18 and thermocouple 20. The hardened steel may be A10, S7, or P20. As best seen in FIGS. 2 and 3, the top of body 12, nearest the injection nozzle 70, is provided with an upwardly extending concentric rim section 32 which surrounds a depressed surface 33 that provides an insulating air gap between the rear of mold half 10 and machine fixed platen 3 when mold half 10 is bolted thereto. The surfaces of upwardly extending rim section 32 are preferably provided with a lapped fit for reasons which will become apparent.

Centered in the rear of mold half 10 is a well 34 that terminates in a hemispherical section. Well 34 serves as a distribution chamber from which molten plastic is fed to various flow channels. A typical unrestricted flow channel is illustrated at 35 (See FIG. 3). Each flow channel 35 comprises an upper section 36 and lower section 38. Upper section 36 angles from distribution well 34 outwardly and downwardly from the center of body 12 until it meets lower section 38 which parallels the center of body 12. Thus, molten plastic which enters well 34 is equally divided among the various body flow channels 35 as it is conducted radially away from its center while traveling to the end of tips 16.

Figure 5:
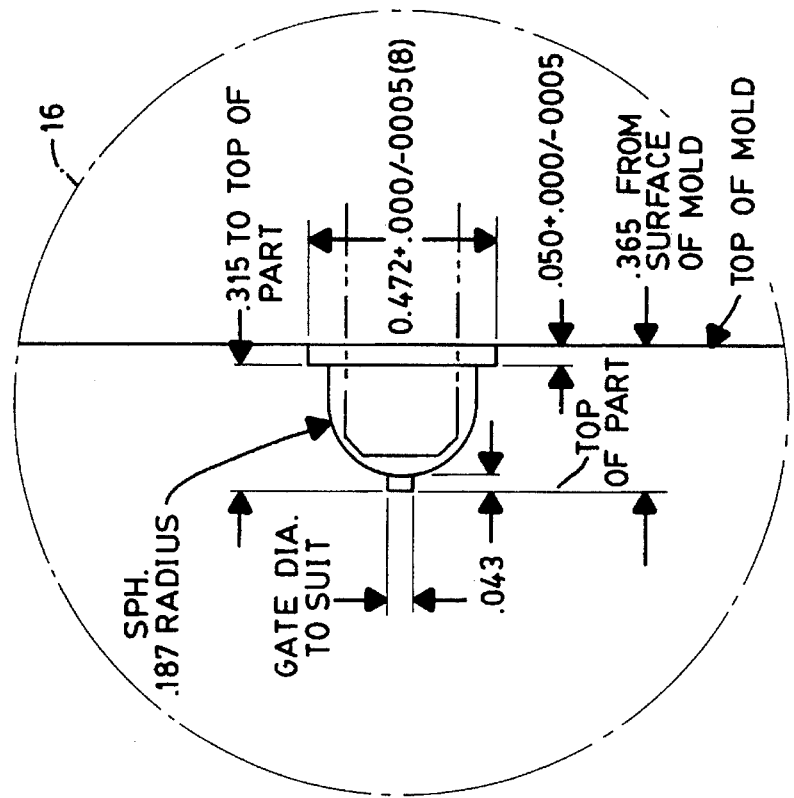
FIGS. 4 and 5 are diagrammatic elevational views of alternate tip configurations that may be used in the invention.

Each lower section 38 is threaded to receive a complementary threaded section of a tip 16. This is best seen FIG. 3A which shows that each tip 16 comprises a threaded head 19 and a neck 21, which is reduced in diameter compared with the internal diameter of lower section 38 to provide an air gap 23 between them. In FIG. 3, notice that two different tip configurations are shown. These tip configurations are those shown in FIGS. 4 and 5. The tip of FIG. 4 is for use in more restrictive flow applications whereas that of FIG. 5 is used where higher flow is required. As can be seen in FIG. 3, the tip on the bottom corresponds to the tip configuration of FIG. 4 and includes a pair of holes 17 (See also FIG. 3A) through which molten plastic can flow. The upper tip of FIG. 3 corresponds to that shown in FIG. 5. Tips 16 are preferably made of a material having high heat conducting properties such as beryllium copper or similar materials.

Because of the equal spacing of flow channels 35, plastic from well 34 is equally distributed to each because all experience equal pressure, and the flow channels and tips are all of similar geometry so as to afford equal resistance to plastic flow.

Figure 6:
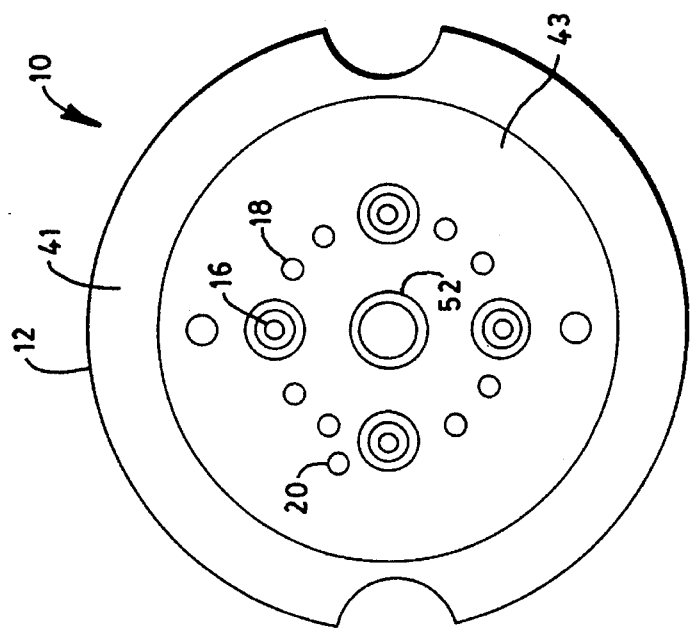

As can be further seen in FIG. 3, each heating cartridge 18 fits into a corresponding hole shown typically at 40. Holes 40 begin in the top surface of interface 14 and extend in length to just short of the bottom surface of body 12. Likewise, a hole 42 is provided to receive thermocouple 20. As best seen in FIGS. 2, 6, and 7, each heating cartridge 18 heats one half of each flow channel 35 so that every flow channel is heated from both sides for even heating. Moreover, it should be apparent that the relative and equal spacing of each flow channel with respect to each heating cartridge assures that each heating cartridge is heating the same thermal mass in each case. No matter how many tips are used in the invention, this principle is followed in every case to assure that every flow channel is identically heated to every other. For convenience, this is done by using a circularly symmetric geometry, but the invention may be practiced with other geometries so long as this principle of equal distribution of heat is adhered to. With this in mind, it can now be seen that a single thermocouple can be used to control the temperature of every flow channel since all experience the same thermal environment.

Lapped surfaces are preferably used where rim section 32 mates with platen 3 to provide a tight seal which prevents plastic from leaking as it flows from well 34. This feature eliminates the need for the traditional "O"-rings in common use.

Interface 14 bolts to platen 3 via a series of bolts 28 which pass through equally spaced holes 52 as best seen in FIG. 3. As can be appreciated, bolts 28 are interspersed between heating elements 18 and flow channels 35 to retain interface 14 against platen 3 and, importantly, so as to assure uniform thermal mass properties for equal heating.

Referring now to FIGS. 2 and 3, it can be seen that mold half 10 includes a rearwardly extending flange 41 that surrounds a depressed surface 43. Surface 43, in turn, includes a plurality of upwardly extending bosses 44, one for each tip 16. The function of the bosses 44 and flange 41 are to seal the mold cavities and locate mold half 10 with respect to the "A"-plate of the mold, which carries the cavity as will be explained later.

As can be seen in FIG. 3, mold half 11 comprises a plurality of plates 48, 50 and 58 that are located downstream of the parting line. Plate or cavity block 46 carries the part cavities and fits into the depressed region surrounded by flange 41. In this connection, bosses 44 each fit into corresponding holes in cavity plate 46, one for each cavity. In this manner, complementary configured locating means between mold half 10 plate 46, the "A"-plate, are provided without the need for traditional locating pins. Thus, mold half 10 defines a receiving cavity for axial and lateral location of both the "A"-plate and mold half 10 with respect to one another.

All of the inventive multitip systems have an integrated support system because of the solid path provided for transmitting forces throughout the system. This system fully supports the mold cavity and safely transfers the molding machine nozzle force through the mold base assembly in a manner to be explained. With this feature, the multitip system allows the mold cavity to experience less flexing and hence last longer.

Furthermore, the support system is dimensioned to provide thermal isolation between the two mold halves by providing a gap 56 between them. This assures that less thermal mass is presented to heating cartridges.

Locating pins 54, only one shown, align the "B"-plates of mold half 11, i.e., plates 48, 50, and 58. The mold is first assembled by bolting half 10 to platen 3. "A"-plate 46 is then bolted to half 10 and the two self align. Afterwards, the "B"-plates are assembled and aligned with one another via the locating pins 54 and the "A"-plate. The mold is closed and the "B"- plate is bolted to platen 4.

All tips 16 are made of very high, thermally conductive material as already mentioned. In addition, each tip 16 is provided with several coatings of wear and abrasion resistant plating to enhance their reliability and useful life. As can be appreciated, tips 16, because they are threaded in body 12, are easily replaced in the field by the user. The "P" or pinpoint style tips illustrated in FIG. 4 are recommended where minimal gate vestige is required, and those in FIG. 5 where larger gate vestige can be used.

Reference again is made to FIG. 3 which shows a typical mold layout with which multitip mold halves 10 and 11 of the invention may be used. As shown, the mold layout from the top down comprises first the injection machine nozzle 70 which mates with well 34 in the top, nozzle-facing, surface of interface 14. Other elements of the mold layout comprise the "B"-plates, 46, stripper plate 48, plate 50, and support plate 58. When the mold opens, stripper plate 48 removes pans from the cavities in a well-known manner. Cavity cooling lines 60 are provided and operate in a well-known manner to cool parts to solidify them to the shape of the cavity.

Also shown are part cavities, typically at 64. These particular cavities are for molding golf ball markers. Wiring from heater cartridges 18 and thermocouple 20 are conducted from mold half 10 via a wiring race (not shown)

It is again to be noted that each tip 16 emerges from the bottom of body 12 via corresponding bosses indicated typically by numeral 44. Bosses 44 assist in properly positioning mold half 10 in the mold layout so that tips 16 are properly aligned with mold cavity gates. In addition, their exit diameters are slightly larger than the reduced diameter necks 21 of tips 16.

Figure 3A:
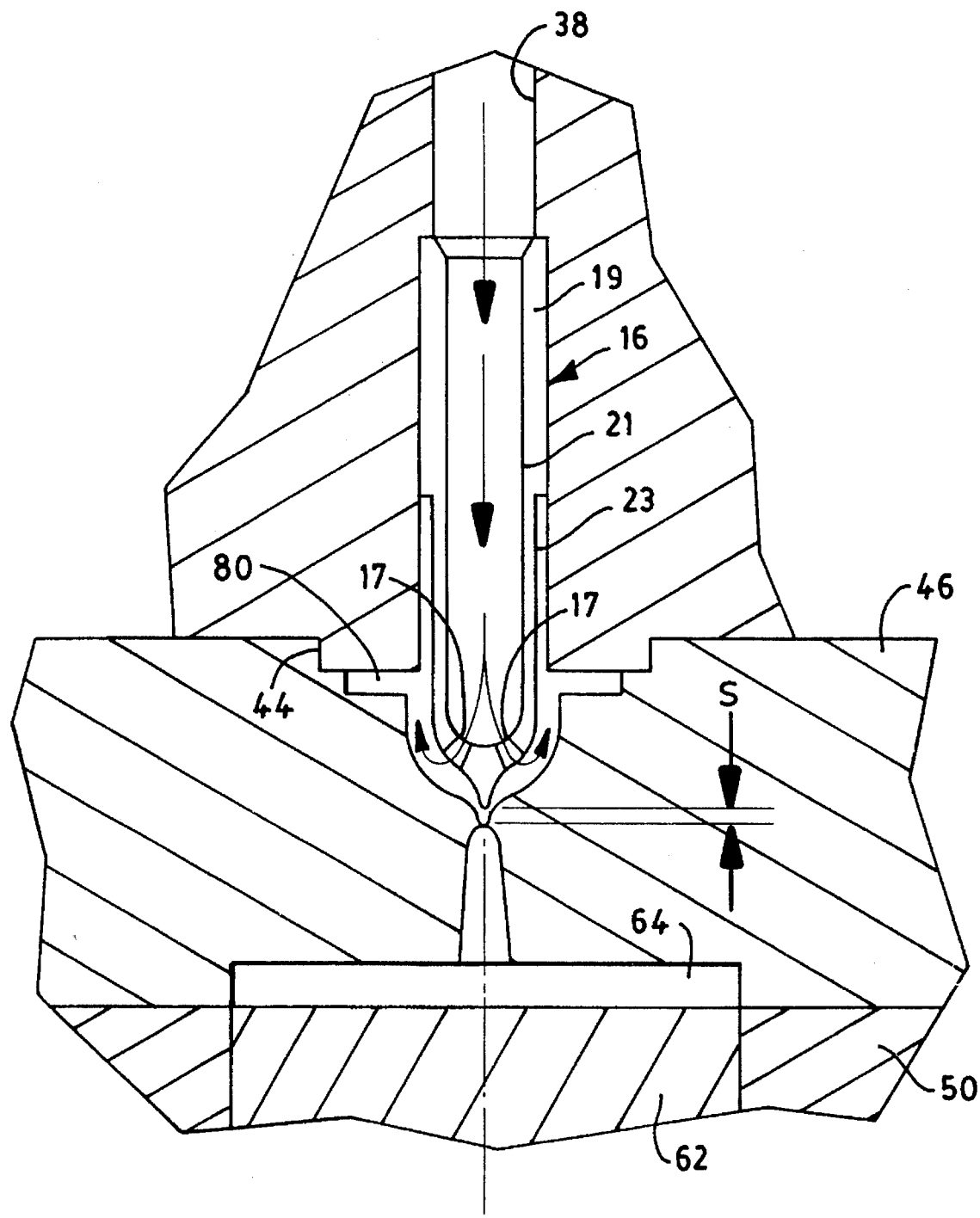
FIG. 3A is an enlarged diagrammatic cross-sectional view of a portion of the molding system of FIG. 3 with parts broken away.
Figure 4:
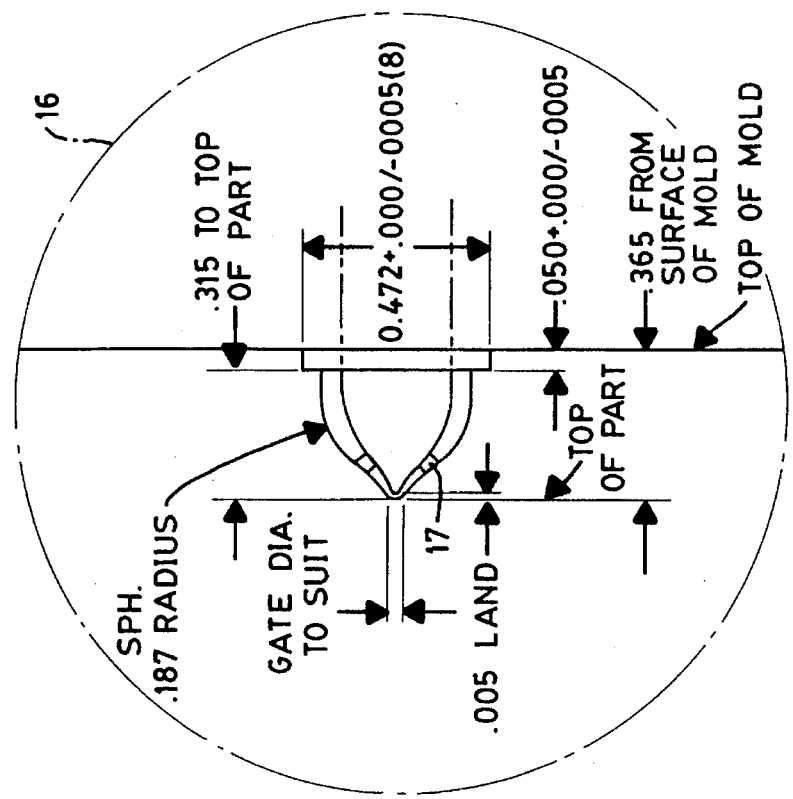

Referring now to FIG. 3A, there is illustrated in enlarged fashion more detail on how the tips 16 of mold half 10 mate with the gate of a cavity 64 formed between cavity block 46 and mold 62 (typical). As seen, boss 44 fits in registration with a complementary configured corresponding recess in cavity block 46. Also in block 46 is machined a well 80 (See FIG. 3A) for receiving molten plastic. Well 80 is shaped with a geometry similar to that of tips 16, but larger and slightly tapered as it approaches the cavity gate. The very end of tip 16 also is carefully kept away from the cavity gate by a distance, S, empirically determined to maintain flow and typically a few thousandths of an inch. Well 80 also communicates directly with air gap 23 formed in a manner previously described. As such, gap 23 and well 80 fill with molten plastic to provide additional thermal isolation between mold half 10 and the remaining elements of the mold. As heat is always conducted to the extreme end of tip 16 because of its high heat conducting properties, this is generally the location where temperature is monitored via thermocouple 20, gate "freeze" with mold half 10 very rarely can occur.

As mentioned earlier, multitip systems are available in several different versions as shown in FIGS. 6 and 7. These various versions allow the mold designer to select the number of cavities to be filled per individual module. If required, it is also possible to use one multitip module with several tips feeding only one part. This is especially useful when critical part symmetry is required. In all versions, the principle of presenting equal thermal mass to each heating cartridge is strictly followed so that only one thermocouple is needed.

FIGS. 6 and 7 show different cavity drop configurations for the invention. FIG. 7 is the eight drop embodiment discussed in detail above. FIG. 6 is a four drop configuration showing that two heating elements 18 may be dispersed between cavity drops if needed where more even distribution of heat is required compared with only one between drops.

As can be appreciated, a very simple, yet small and robust molding architecture particularly suitable for use in spatially limited bench-type machines or others where space is at a premium, has been provided with many of the functions previously resident in a plurality of plates integrated into a system of few plates and no traditional locating pins between the usual A-plate and what would otherwise have been a mold base. Indeed, the mold base has disappeared entirely with its function integrated into the self-contained front half of the invention.

Those skilled in the art may make changes to the invention without departing from the scope of its teachings. Therefore, it is intended that the embodiments described above be considered as illustrative and not be construed in a limiting sense.

What is claimed is:

1. A self-containing multitip hot runnerless apparatus for use in transporting molten plastic from an injection machine to a plurality of mold cavities while controlling the temperature of the molten plastic, said apparatus comprising:

a distribution body of given length and having a central longitudinal axis extending therethrough, said body having top and bottom surfaces, a distribution well formed in said top surface for receiving molten plastic, a plurality of unrestricted and identically configured through flow channels formed between said distribution well and said bottom surface of said body to transport molten plastic from said distribution well along said flow channels and toward said bottom surface, each of said through flow channels having lower sections adapted to releasably receive tips for transporting molten plastic beyond said bottom surface to gates of respective mold cavities, a plurality of heater cartridge holes for said flow channels and equally spaced within said body with respect to said flow channels so that each flow channel is surrounded in said body by an identical thermal mass to assure uniform heating of said flow channels, said heating cartridge holes being non-through holes extending from said top surface of said body to a predetermined length short of said body given length, and a single non-through thermocouple hole, also extending from said top surface of said body to a predetermined length short of said body given length and near said bottom surface thereof, said thermocouple hole being closely adjacent one of said plurality of said flow channels to monitor the temperature thereof near said bottom surface of said body, said distribution body including a surface adapted to attach directly to a flat injection machine platen, said distribution body further including means for automatically aligning the axial and lateral position of said apparatus with respect to a cavity carrying plate;

a plurality of heating cartridges, each heating cartridge being located in a corresponding one of said heater cartridge holes to supply heat to said distribution body when energized;

a thermocouple located in said thermocouple hole to monitor temperature and supply temperature feedback information for controlling the temperature of the molten plastic in all of said flow channels;

a plurality of tips, one for each of said plurality of flow channels, each of said tips being releasably engageable within a respective one of said lower sections of said flow channels to form an air space to prevent heat loss, each of said tips being fabricated of a material with high heat conducting properties relative to that of said distribution body to conduct heat from said distribution body outside of said bottom surface thereof to prevent plastic freeze at cavity gates; and a plurality of mold plates at least one of which is moveable and includes means for defining at least one mold cavity, said plurality of mold plates including a stationary plate to which said distribution body is directly, fixedly attached so that it does not move, said moveable mold plate and said distribution body including complementary configured means for automatically axially and laterally aligning said distribution body and said moveable plate when said distribution body and said moveable plate are brought into operative engagement with respect to one another to form the mold cavity.

2. The apparatus of claim 1 wherein said tips are fabricated of beryllium copper.

3. The apparatus of claim 1 wherein said tips and said lower sections of said plurality of flow channels have complementary configured threads to allow said tips to be releasably screwed to said distribution body.

4. The apparatus of claim 1 wherein said distribution body has complementary lapped mating surfaces to provide a seal between it and the platen for preventing molten plastic from escaping from said apparatus when said distribution body is attached to the platen.

5. The apparatus of claim 1 wherein said means for locating said distribution body with respect to a cavity carrying plate comprises a means for defining a receiving cavity for accepting at least a part of the cavity carrying plate.

6. The apparatus of claim 1 wherein said distribution body is both circularly symmetric.

7. The apparatus of claim 1 wherein said distribution body is fabricated of hardened steel selected from the group consisting of A10, P20, and S7.

8. The apparatus of claim 1 wherein said bottom surface of said distribution body further includes a boss for buttably engaging a support pin for transferring force loads from said through said distribution body and onto external mold elements so as to prevent undesired flexing of the mold cavity to enhance its useful lifetime.

9. The apparatus of claim 1 wherein each of said cartridge holes is positioned for heating one-half of each of said flow channels and each of said flow channels is positioned to be heated, in part, by two heating cartridges.

10. The apparatus of claim 1 wherein said complementary configured means on said distribution body comprises an upwardly extending flange and at least one boss and on said moveable plate comprises corresponding recesses for receiving said bosses.

* * * * *